United States Patent Office 2,742,504
Patented Apr. 17, 1956

2,742,504
HEPTADECYL AMINE COMPOUND

Godfrey F. Grail, New York, N. Y., assignor to Nepera Chemical Co., Inc., Yonkers, N. Y., a corporation of New York No Drawing. Application March 23, 1953, Serial No. 344,205

3 Claims. (Cl. 260—583)

This invention relates to substituted ethylene diamine compounds and relates more particularly to the novel compound N-heptadecyl-N-methyl-N',N'-dimethyl-ethylene diamine.

An object of this invention is the provision of a virucidal agent effective in vivo against certain virus-caused diseases.

Another object of this invention is to provide a therapeutic agent active against certain viruses and comprising N-heptadecyl-N-methyl-N',N'-dimethyl-ethylene diamine as the essential active component, which therapeutic agent may be utilized in various pharmaceutical dosage forms.

Other objects of this invention will appear from the following detailed description.

It has now been found that N-heptadecyl-N-methyl N',N'-dimethyl-ethylene diamine exhibits pronounced virucidal action against the mumps virus in vitro as well as in vivo and also exhibits some action against the virus responsible for causing Newcastle disease in fowl.

Since N-heptadecyl-N-methyl-N',N'-dimethyl-ethylene diamine readily forms water soluble acid salts with both inorganic and organic acids which have little taste or odor, this novel therapeutic compound can be readily formulated into various pharmaceutical dosage forms and readily absorbed into the body for rapid therapeutic action.

The novel compound of our invention may be prepared by reacting a beta-dimethylamino-ethyl halide, such as the chloride or bromide, with heptadecyl methyl amine. The reaction may be carried out conveniently in solution in a neutral solvent such as xylene, for example. Thus, in order to obtain the novel compound of my invention, beta-dimethylamino-ethyl chloride and a molecular excess of heptadecyl methyl amine are dissolved in xylene and the solution obtained then heated under pressure as in an autoclave, for example, at a temperature of about 140–180° C., usually for 8 to 48 hours or even 60 hours. After cooling, the reaction mixture is made alkaline by the addition of aqueous sodium hydroxide. The aqueous layer is removed and extracted with ether. The ether extract is added to the xylene layer and the combined ether and xylene layer then subjected to fractional distillation. After the removal of the ether and the xylene, the unreacted heptadecyl methyl amine is distilled off. The N-heptadecyl-N-methyl-N',N'-dimethyl-ethylene diamine is recovered by a further distillation under reduced pressure.

In order further to illustrate my invention, but without being limited thereto, the following example is given:

Example 94.4 parts by weight of heptadecyl amine and 19.5 parts by weight of beta-dimethyl amino-ethyl chloride in solution and 160 parts by weight of xylene are intermittently mixed and the solution obtained heated in a sealed vessel under autogenous pressure for 24 hours at 150° C. The emulsion obtained is made alkaline by the addition of sodium hydroxide to a pH of 11.0. The alkaline mixture is extracted with ether and the extracts combined. After removal of the ether, the residue is fractionated to remove the water present and to distill off the xylene. The sparingly water-soluble residue is dissolved in hot water and the aqueous solution made alkaline with aqueous 40% sodium hydroxide. The alkaline solution is then extracted several times with ether, the ethereal extracts combined and dried over potassium hydroxide. The dry ether layer is decanted and the ether then distilled off. The product, N-heptadecyl-N-methyl-N'-N'-dimethyl-ethylene diamine, is distilled over at 160–169° C. under a pressure of 0.6 mm. of mercury. The liquid is soluble in the common organic solvents such as ether, alcohol and benzene.

This novel diamine compound exhibits marked virucidal action against the mumps virus and some action against the Newcastle virus. When utilized as a therapeutic agent it is preferably employed in the form of its water-soluble salts such as the sulfate or hydrochloride. My novel diamine may be utilized in the form of other inorganic salts such as hydriodide, phosphate or hydrobromide, or as the tartaric acid salt, the maleac acid salt, the lactic acid salt, the acetate and the citric acid salt. The salts of said novel diamine with aromatic acids such as benzoic acid, gentisic acid, salicylic acid, resorcylic acid, phenylacetic acid, mandelic acid, cinnamic acid and hydrocinnamic acid are also valuable, as well as the salts with nicotinic acid and other pyridine carboxylic acids including the polycarboxylic acids. My novel compound may be administered as an aqueous solution and may also be compounded in the form of pills, tablets, capsules, etc., with or without other therapeutic agents in combination therewith, employing the usual solid pharmaceutical carriers such as talc, lactose, dextrose, magnesium stearate, etc.

It is to be understood that the foregoing detailed description is given merely by way of illustration and that many variations may be made therein without departing from the spirit of my invention.

Having described my invention, what I desire to secure by Letters Patent is:

1. The compounds of the group consisting of N-heptadecyl-N-methyl-N',N'-dimethyl-ethylene diamine and the non-toxic water-soluble acid salts thereof.

2. Process for the production of N-heptadecyl-N-methyl-N',N'-dimethyl-ethylene diamine which comprises reacting heptadecyl methyl amine with a beta-dimethylamino-ethyl halide.

3. Process for the production of N-heptadecyl-N-methyl-N',N'-dimethyl-ethylene diamine which comprises reacting heptadecyl methyl amine with a beta-dimethylamino-ethyl chloride.

References Cited in the file of this patent

FOREIGN PATENTS 547,987     Germany _____ Mar. 17, 1952

OTHER REFERENCES

Linsker et al., Jour. Am. Chem. Soc. (1945), vol. 67, pp. 1581–2.